(12) United States Patent
Wilson et al.

(10) Patent No.: US 6,490,561 B1
(45) Date of Patent: Dec. 3, 2002

(54) CONTINUOUS SPEECH VOICE TRANSCRIPTION

(76) Inventors: Dennis L. Wilson, 1325 Greenwood Ave., Palo Alto, CA (US) 94301; James L. Wayman, 1167 Chaparral Rd., Pebble Beach, CA (US) 93953; John Zugel, 973 Banbury Way, San Jose, CA (US) 95133

( * ) Notice: Subject to any disclaimer, the term of this patent is extended or adjusted under 35 U.S.C. 154(b) by 811 days.

(21) Appl. No.: 08/882,612

(22) Filed: Jun. 25, 1997

(51) Int. Cl.$^7$ .............................................. G10L 15/04
(52) U.S. Cl. ...................... 704/251; 704/243; 704/277; 704/235; 704/231
(58) Field of Search ................................. 704/251, 243, 704/245, 231, 256, 255, 235, 254, 244, 277, 200, 252; 395/200.33, 200.32, 200.58, 200.59; 379/89

(56) References Cited

U.S. PATENT DOCUMENTS

| | | | | |
|---|---|---|---|---|
| 4,081,607 A | * | 3/1978 | Vitols et al. ................ | 704/200 |
| 4,763,278 A | * | 8/1988 | Rajasekaran et al. .... | 364/513.5 |
| 4,805,219 A | * | 2/1989 | Baker et al. ................ | 704/270 |
| 4,837,831 A | * | 6/1989 | Gillick et al. ............... | 704/270 |
| 4,852,170 A | * | 7/1989 | Bordeaux ................... | 704/251 |
| 4,866,778 A | * | 9/1989 | Baker ........................ | 704/250 |
| 4,914,703 A | * | 4/1990 | Gillick ....................... | 704/254 |
| 4,972,485 A | * | 11/1990 | Dautrich et al. ............ | 704/256 |
| 4,989,248 A | * | 1/1991 | Schalk et al. .............. | 704/258 |
| 5,027,406 A | * | 6/1991 | Roberts et al. ............ | 704/251 |
| 5,524,169 A | * | 6/1996 | Cohen et al. .............. | 704/231 |
| 5,526,407 A | * | 6/1996 | Russell et al. ............. | 379/89 |
| 5,715,367 A | * | 2/1998 | Gillick et al. ............... | 704/254 |
| 5,737,724 A | * | 4/1998 | Atal et al. .................. | 704/251 |
| 5,752,227 A | * | 5/1998 | Lyberg ....................... | 704/235 |
| 5,754,972 A | * | 5/1998 | Baker et al. ................ | 704/200 |
| 5,758,319 A | * | 5/1998 | Knittle ....................... | 704/251 |

OTHER PUBLICATIONS

Rabiner et al., (Fundamentals of Speech Recognition, "Context–Dependent Subword Units", Section 8.9, pp. 458–477, 1993), Jan. 1993.*

Jankowski et al., ("A Comparison of Signal Processing Front ends for automatic Word Recognition", IEEE Transactions on Speech and Acoustic Processing, vol. 3, No. 4, Jul. 1995, pp. 286–293), Jul. 1995.*

Shirai et al., ("Multi–Level Clustering of Acoustic Features for Phoneme Recognition Based on Mutual Information", IEEE, Feb. 1989, pp. 604–607).*

Sandhu et al., ("A Comparative Study of Mel Cepstra and EIH for phone classification under adverse conditions", IEEE, May 1995, pp. 409–412).*

* cited by examiner

Primary Examiner—Vijay Chawan (57) ABSTRACT

A method and apparatus that provide for automatic speech transcription that may be used transcribe structured reports. The method and apparatus provide for speaker dependent, continuous speech recognition using a limited vocabulary. Transcription is based on recognition of a vocabulary of sounds followed by a translation to text. The translation to text matches spoken sounds to sounds contained in similar recorded text sequences. Training involves speaking a set of words with the desired sounds imbedded therein. The method and apparatus recognize phrases, not words, and works well in a radiology or similar application because of the use of a very limited vocabulary to generate reports.

6 Claims, 3 Drawing Sheets

CONTINUOUS SPEECH VOICE TRANSCRIPTION

BACKGROUND

The present invention relates generally to transcription methods and apparatus, and more particularly, to a continuous speech voice transcription method and apparatus for use in transcribing structured reports, such as radiology reports, and the like.

Transcription is a major bottleneck in timely radiology reporting, for example. Radiology images may be acquired, read, and dictated in a few minutes, but many days may pass until the transcription is complete. Similar problems occur in medicine, law and other areas of endeavor.

Report transcription has traditionally been a process that involves a number of people. In its most primitive form, the transcription is to a cassette that is collected and carried to the transcriptionist where the cassettes are put in an "in" basket. The transcriptionist sequentially processes incoming cassettes, transcribing and printing the reports, and sending them back to the radiologists for signing. If there are corrections, there is another cycle using the transcriptionist.

A more advanced form of transcription uses a communication network to record the voice report such that the transcriptionist can retrieve the recording directly at a workstation without transporting the physical cassette. The wait in a transcription queue can be several hours in an efficient hospital to several days for less efficient hospitals to generate a typical report.

Thus, if the transcription were performed automatically, the text report could be available at the end of the dictation with no waiting for several hours to several days for the transcriptionist to complete the transcription task. The computing horsepower of a computer workstation can be used to perform the automatic transcription. What is needed is an automatic transcription algorithm that can transcribe the dictated reports.

Electronic reports may be structured, such that either a fill in the blanks report or a full structured report are generated. The two variations are related. The structured report starts with a basic report for a pathology, such as mammography for example. In order to make the electronic report complete and like other reports, the American College of Radiology has established a mammography reporting form. The form is a basic report with areas that can be filled in with words that are selected from a list of words for that blank in that report. This "fill in the blanks" reporting makes all mammography reports very similar, using simple variations on the language for each of the individual reports.

The structured form of the fill in the blanks report is much more useful in computer processing to determine outcomes of the treatment. The processing performed by the computer can ignore filler text and process the data contained in the filled in blanks to generate the report. Some of the blanks describe the severity of the pathology. Other blanks describe the changes in the pathology as a result of whatever treatment has been performed. Over a period of time the progression of the contents of the blanks on the form show a picture of the progress of the patient. After a period of time, the outcome for the patient can be evaluated.

A yet more structured form of the electronic report is a collection of codes. The codes point to selected phrases in a dictionary of codes. The SNOMED dictionary maintained by the National Library of medicine is one such dictionary. This micro-glossary has words and phrases that are useful in describing a large number of pathologies including the location and severity of the pathology. To read the report requires converting the codes to text form. For a computer to read the codes is trivial, since the codes are an almost ideal representation of information for the computer. The outcomes must be assessed, and thus the report should be organized to make the assessment easy. As a result, structured reporting including the use of codes to describe the pathology and its progress, will be used more in the future.

The radiologist should be able to generate the report while looking at an image that is to be evaluated. With the attention on the image, the radiologist can progress through the image in an orderly fashion, making sure that all aspects of the diagnosis are properly covered in the report. The transcription should therefore be something that can be done while looking at the image that is diagnosed. The radiologist should not have to look at every word generated to make certain that the word is properly spelled, for example. While not as important a requirement, it would be beneficial if the radiologist could dictate the report without using hands. The radiologist should use his or her hands to manipulate images, change to historical images for comparison, and magnify selected areas of the images for detail.

A number of transcription devices and methods are currently available. They fall into several categories including isolated word recognition, continuous speech recognition, batch transcription after dictation, and on the fly transcription while dictating. Generally the transcription devices require a training cycle. A new user must train the system to recognize a vocabulary of words. The isolated word recognition devices use patterns of each individual word in performing the recognition. A typical training cycle requires one-half hour to several hours to say each of the words or phrases required for training.

The transcription devices are generally organized to recognize free text spoken by an individual. The transcription devices are advertised with a description of the number of tens of thousands of words that can be recognized by the system. These devices use a decision procedure that requires the recognition of isolated words from a very large vocabulary for a single individual. Many isolated words are short and easy to confuse with other words. When the vocabulary available is large, there is more possibility of confusion with other words in the vocabulary.

Isolated word recognition devices may be used to generate fill in the blanks reports. The blanks are filled with isolated words. If the words could be restricted to only the few words that are available for the particular blanks, the recognition problem would be very much easier and the performance much better. Similarly, structured reporting using codes could be performed effectively by isolated word recognition devices using small vocabularies. However, this has not been done in the past.

Batch transcription after dictation method uses dictated voice reports that are transcribed at a later time. However, this method is not desirable. The radiologist must review the transcribed text at a later time to determine that the information has been accurately transcribed. Time delays associated with the batch processing method also make the approach less desirable.

Continuous speech recognition devices are useful. When a radiologist does not have to speak each word as an isolated word, generation of the report can proceed much more quickly with less attention from the radiologist. However, while it is desirable, continuous speech recognition of free text is generally not performed. The problem is technically difficult. The usual result is transcribed text with many errors.

In view of the above, it is believed that a report transcription tool that generates reports using a limited number of sounds may be advantageously employed in a number of disciplines.

A number of patents relate to voice recognition, and the like. The patents may be grouped into those disclosing template matching, single word recognition, hidden Markov model, and subphrase recognition. Template matching is a generic approach. The cited patents typically have different measurements to match against templates of words. Single word recognition requires an easily recognized beginning and ending of a word. This technique requires the individual to use an artificial one-word-at-a-time speaking style. Hidden Markov model techniques use probabilistic techniques to determine the most probable next word in a sequence. The probabilistic model is generated by analyzing long sequences of text. Subphrase recognition operates on very short segments of sounds, generally less than one word. The hidden Markov model above could be used for such combinations of subphrases to recognize words.

The concept of a sound alphabet is disclosed in U.S. Pat. No. 4,829,576, for example, but others also contain the basic idea of recognizing sounds from an alphabet of sounds. Many have very complex sounds representing not only basic phoneme sounds but sequences of phonemes with transitions therebetween.

Template matching is disclosed in U.S. Pat. No. 5,329,608 issued to Bocchieri, which matches subword strings, not phrases and is believed to generally exhibit poor performance. U.S. Pat. No. 5,142,585 issued to Taylor discloses template matching of stored reference vocabulary words, single word recognition, and adaptation to the surrounding sounds and speaking peculiarities of the individual. U.S. Pat. No. 4,712,242 issued to Rajasekaran discloses speaker independent recognition of a small vocabulary which uses zero crossings and dynamic time warping, and spoken words are compared to reference templates of the individual vocabulary words. U.S. Pat. No. 4,284,846 issued to Marley discloses single word recognition using template matching, and wherein transitions and transition glides are characterized. U.S. Pat. No. 4,910,784 issued to Doddington discloses single word recognition using binary feature components and template matching to reference words.

U.S. Pat. No. 5,425,128 issued to Morrison discloses single word recognition with training on each word to be recognized. U.S. Pat. No. 4,866,778 issued to Baker discloses single word at a time recognition. U.S. Pat. No. 4,811,399 issued to Landell discloses a single word recognizer using "sound templates". U.S. Pat. No. 4,336,421 issued to Welch discloses using inter-segment and inter-string boundaries for grouping speech for single sound segment recognition, which is related to single word recognition. U.S. Pat. No. 5,165,095 issued to Borcherding discloses speaker independent templates for recognizing telephone numbers. U.S. Pat. No. 4,780,906 issued to Rajasekaran discloses speaker independent limited word recognition using energy measures and zero crossing rate to generate feature vectors. U.S. Pat. No. 4,388,495 issued to Hitchcock discloses speaker independent single word at a time, and uses zero crossings to established voiced, fricative, and silence, and uses templates of zero crossings. U.S. Pat. No. 5,231,670 issued to Goldhor discloses dictation events and text events that are used in recognizing single words and commands. U.S. Pat. No. 5,054,085 issued to Meisel discloses pitch, spectrum parameters, and time measurements for speech recognition. The training process is involved, and a scheme for mapping an individual's speech to general speech templates is disclosed. U.S. Pat. No. 5,524,169 issued to Cohen discloses location specific libraries of templates adapt to speech accents, and includes place names, proper names, and business establishments in template set. U.S. Pat. No. 4,763,278 issued to Rajasekaran discloses speaker independent recognition of a small vocabulary, and uses zero crossings rates for measurement, wherein templates of quantized zero crossing rates are used to recognize words. U.S. Pat. No. 5,526,466 issued to Takizawa discloses single word recognition using durations of speech units. U.S. Pat. No. 5,212,730 issued to Wheatley, discloses speaker independent recognition of names for access, and includes extensive training. U.S. Pat. No. 4,618,984 issued to Subrata, discloses single word recognition using adaptive training from continuous speech, which uses a method of shortening the training cycle to make the method easier.

The use of a hidden Markov models is disclosed in U.S. Pat. No. 5,509,104 issued to Lee, which discloses a hidden Markov model approach to small vocabulary, speaker independent speech recognition. U.S. Pat. No. 5,033,087 issued to Bahl discloses that Markov models are used with variations in sound structures of phonemes in various contexts to recognize words. U.S. Pat. No. 5,278,911 issued to Bickerton discloses multiple examples of individual words for training, and uses a neural network and hidden Markov model for recognition. U.S. Pat. No. 4,852,180 issued to Levinson discloses speaker independent, continuous speech recognition. and implements a continuously variable-duration hidden Markov model. U.S. Pat. No. 4,783,804 issued to Juang discloses a hidden Markov model.

Subphrase recognition is disclosed in U.S. Pat. No. 4,829,576 issued to Porter, which uses text string from recognized utterance to find same text string in other places in sample text and uses results to limit the words to be recognized and/or the probability of the words that can be next. In contrast, the present invention converts the text to a sound alphabet that can be searched for matches to the sounds that are being spoken. U.S. Pat. No. 4,181,813 issued to Marley discloses a phoneme recognizer that uses delta mod at two different rates to recognize attacks and transitions, and uses speech "waveform characteristics" in a phoneme decision tree to recognize the phonemes. U.S. Pat. No. 5,208,897 issued to Hutchens discloses a system that recognizes sub-syllables, maps collections of sub-syllables to syllables, and maps collections of syllables to words for word recognition.

Other speech-related techniques are disclosed in a number of patents. U.S. Pat. No. 4,713,777 issued to Klovstad discloses use of a grammar graph and non-speech segment recognition. U.S. Pat. No. 4,757,541 issued to Beadles discloses general analysis to identify group of phonemes followed by optical analysis of lip shape to determine member of group. U.S. Pat. No. 3,812,291 issued to Brodes discloses use of "Property Filters", wherein matching to previous reference patterns from binary signals generated from the Property Filters. U.S. Pat. No. 5,168,548 issued to Kaufman inserts selected recognized words into canned text reports. U.S. Pat. No. 4,087,632 issued to Hafer discloses a feature extractor uses the Coker vocal tract model to extract tongue position and motion along with other variables, and uses formants in the modeling and matching to library words. U.S. Pat. No. 4,713,778 issued to Baker discloses dynamic programming with grammar graphs applied to acoustic speech sound parameters. Recognizes keywords.

U.S. Pat. No. 4,718,088 issued to Baker discloses a training method for use with U.S. Pat. No. 4,713,778. U.S. Pat. No. 5,027,406 issued to Roberts discloses single word or continuous speech using "word models". When the recognizer is confused, it presents possible words and asks the user to select. The selection is used to update the word model for that word and add the word to the vocabulary, if it is not present.

Accordingly, it is an objective of the present invention to provide for a continuous speech voice transcription method and apparatus for use in transcribing structured reports, such as radiology reports, and the like, using a limited number of sounds and requiring a very short training cycle.

SUMMARY OF THE INVENTION

To meet the above and other objectives, the present invention provides for an apparatus and method that embody a new approach for performing automatic speech transcription. The approach is based on simple recognition of a vocabulary of sounds (a sound alphabet) followed by a translation to text. The translation to text uses a novel technique based on matching spoken sounds to sounds of previous text sequences.

The system comprises a microphone that is coupled to a sound processor or computer. The sound processor is coupled to a printer or display that displays the transcribed text. A sound dictionary is created that is stored in a memory of the sound processor that represents a translation between text and sound. The sound dictionary may be formed by using a sound translation guide similar to that contained in Webster's dictionary, for example. The sound dictionary is used for any individual that uses the system.

The system is trained for each specific individual that is to use it because of differences in each individual's voice characteristics. The individual that is to use the system speaks a predefined set of words containing a limited number of predefined sounds into the microphone. The sound processor processes the sounds to create a sound alphabet that is specific to the individual. The sound alphabet is represented by a set of symbols, such as single and double letters, for example, and may be generated using Cepstral coefficients, for example.

The sound alphabet for the individual is used to recognize sounds spoken by the individual and which are output for comparison to sounds contained in sound strings generated by applying text to the sound dictionary. When the individual speaks a particular sound, a corresponding sound from the sound alphabet is accessed. Each sound that is accessed in the sound alphabet is compared to the sounds in the sound string. When the spoken sound string matches the sound string from the text string, the corresponding phrase, or string of text, contained in the recorded text is accessed and output for printing or display.

Thus, during transcription, the individual speaks phrases into the microphone. The phrases are processed to recognize the sounds of the individual's sound alphabet. The sounds of the individual's sound alphabet are then compared with sounds from the sound strings. When sound matching occurs, text phrases contained in the recorded text that match the sounds from the sound dictionary are accessed. The recorded text that corresponds to the sounds from the translated text sound string is output to the printer or display as part of a printed transcription.

The present invention only processes a limited set of text relating to a specific area, such as radiology, for example, and thus only a limited number or set of sounds is required for the translated sound string. Phrases that are spoken by the individual are processed using the individual's sound alphabet to access matching phrases contained in the text. Thus, spoken phrase segments are matched to phrases contained in the prerecorded text, which is output as part of the transcription.

The present invention provides for speaker dependent, continuous speech recognition using a limited number of sounds, and makes the speech easier to recognize. Training for the processing requires only speaking a set of words with the desired sounds imbedded therein. The training process takes about thirty seconds. The system and method are therefore speaker dependent, in that the present approach functions only for the individual that is currently using the system and who has generated a training set of sounds.

The present invention recognizes phrases, not words. The phrases are connected speech. The only departures from continuous sounds are those that occur naturally, such as glottal stops and pauses between words. The lack of speech is treated as just another sound in the sound sequence. A natural phrasing is in terms of sentences. When a period is found in the text, a new search for a phrase that matches the continuation of the speech is initiated.

The present invention can generate long strings of text with only a few words. That is, the sound sequence for a text string can be a "code word" for the text string. A simple example is "Normal Chest". Many radiologists dictate a long string of text that is used as a report when the patient has a normal chest. Many other text strings may also be triggered by a phrase. The present invention works well in generating radiology reports because radiologists use a very limited vocabulary to produce the reports.

In contrast to the prior art techniques, the present invention uses a very simple sound alphabet without transition sounds, a very short training cycle, and uses a small body of text that is translated to the sound alphabet. The present invention searches the sequence of translated sounds from the sample text for similar sound sequences representing whole phrases, not single words. The corresponding text segments are then reported as the recognized speech translated to text.

The small training cycle permits the recognition to be speaker dependent, but does not require a large investment of time to use the device. The speaker dependent recognition has much better performance than a speaker independent recognition process. The use of the sound alphabet permits translation of the voice sounds to a speaker independent representation of the sounds. The use of a body of recorded text for the matching process limits the vocabulary to a single subject. The use of the body of text also provides sequences of words in proper order without requiring an extensive analysis process to derive parameters of a hidden Markov model. The recorded body of text provides examples of the next word in sequence instead of a probabilistic model of which words might be next in a sequence as is done in Markov processing.

The present invention employs processing to recognize whole phrases without an established beginning or end. The sequence of sounds as represented in the translated text is without beginning or end. The sounds that are processed thus come from continuous speech. The use of a limited vocabulary provides fewer possibilities for errors. The present invention recognizes whole phrases, with much reduced error rates compared to conventional approaches.

BRIEF DESCRIPTION OF THE DRAWINGS

The various features and advantages of the present invention may be more readily understood with reference to the following detailed description taken in conjunction with the accompanying drawing figures, wherein like reference numerals designate like structural element, and in which.

DETAILED DESCRIPTION

Figure 1:
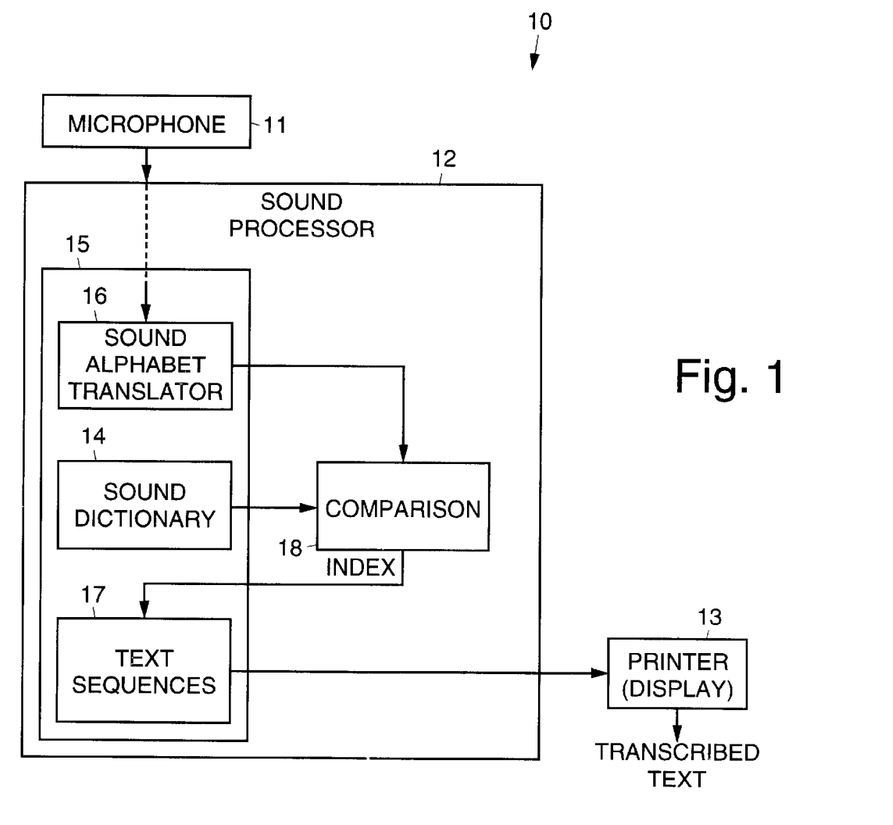
FIG. 1 illustrates a continuous speech voice transcription system in accordance with the principles of the present invention.

Referring to the drawing figures, FIG. 1 illustrates a continuous speech voice transcription system 10 in accordance with the principles of the present invention. The continuous speech voice transcription system 10 comprises a microphone 11 that is coupled to a sound processor 12 or computer 12. The sound processor 12 is coupled to a printer or display 13 that outputs a printed transcription. A sound dictionary 14 is created that is stored in a memory 15 of the sound processor 12 that represents a translation between sound and text that is recorded. The sound dictionary 14 may be formed by using a sound translation guide contained in Webster's dictionary, for example. The sound dictionary 14 is used for any individual that uses the system 10.

The system 10 is trained for each specific individual that is to use it because of differences in each individual's voice characteristics. The individual that is to use the system 10 speaks a predefined set of words containing a limited number of predefined sounds into the microphone 11. The sound processor 12 processes the sounds (using Cepstral processing, for example, discussed later) to create a sound alphabet translator 16 stored in the memory 15 that is specific to the individual. The output of the sound alphabet translator 16 is a set of symbols representing the sounds similar to the representation from the text through the sound dictionary.

The sound alphabet translator 16 for the individual is used to recognize sounds spoken by the individual that are compared 18 to the sounds through the sound dictionary 14. Thus, when the individual speaks a particular sound, a corresponding representation of the sound from sound alphabet translator 16 is accessed. Each sound sequence accessed in the sound alphabet translator 16 is processed to compare them to sounds from text through the sound dictionary 14. When a sequence of spoken sounds match sounds from text through the sound dictionary 14, corresponding phrases contained in recorded text sequences 17 stored in the memory 15 are accessed by way of an index.

Thus, during transcription, the individual speaks phrases into the microphone 11. The phrases are processed to translate the individual's sounds to the individual's sound alphabet translator 16. The sounds contained in the spoken phrases are compared (comparison 18) to sounds from the sound dictionary 14. The matching prerecorded text sequences 17 are then the phrases that match the spoken sounds derived from the sound alphabet translator 16. The recorded text sequences 17 that correspond to the matching sounds from the sound dictionary 14 are output to the printer 13 as part of a printed transcription.

The present invention only processes a limited set of sounds and text sequences 17 relating to a specific area, such as radiology, for example, and thus only a limited number or set of sounds is required for the sound alphabet translator 16 and sound dictionary 15. Phrases that are spoken by the individual are processed using the individual's sound alphabet translator 16 and the sound dictionary 14 to access matching textual phrases contained in the recorded text sequences 17. Thus, spoken phrases are matched to phrases contained in the recorded text sequences 17, which are output to form the transcription.

Figure 2:
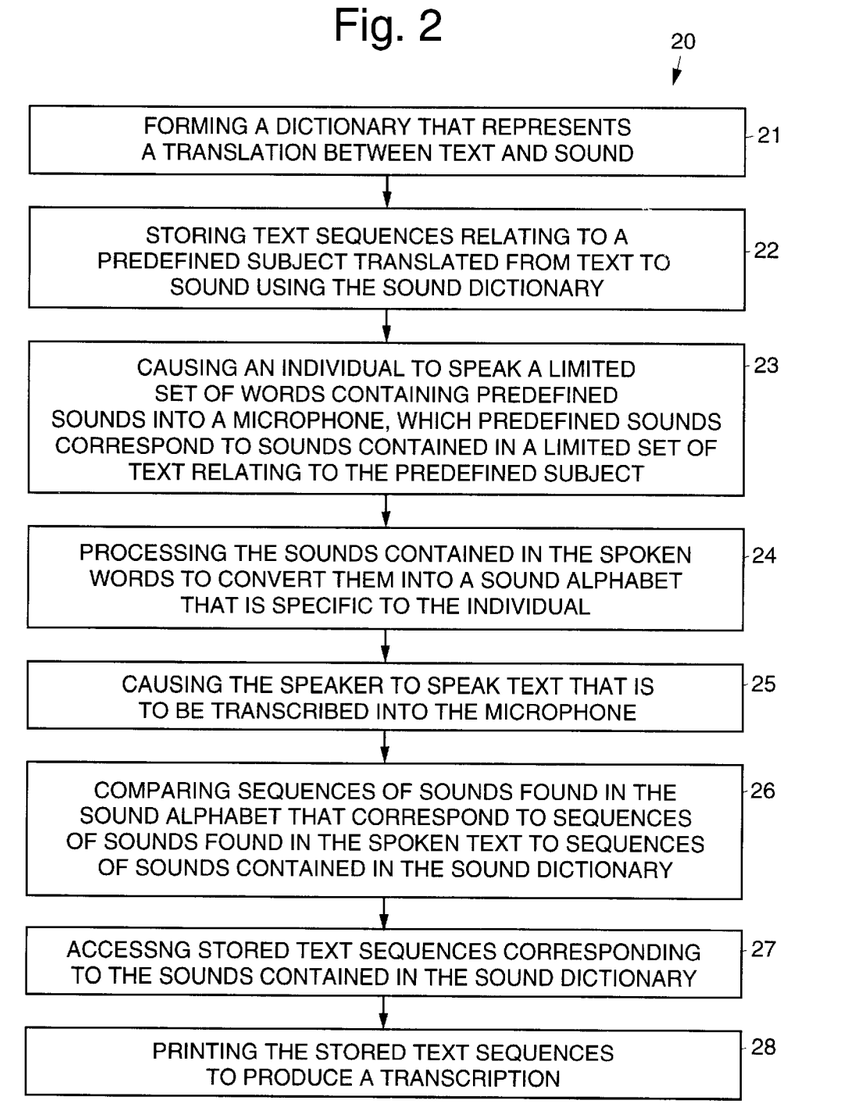
FIG. 2 is a flow diagram illustrating a continuous speech voice transcription method in accordance with the principles of the present invention.

FIG. 2 is a flow diagram illustrating an exemplary continuous speech voice transcription method 20 in accordance with the principles of the present invention. The transcription method 20 comprises the following steps. A sound dictionary 14 representing a translation between text and sound is formed 21. Text sequences 17 relating to a predefined subject that contain sounds in the sound dictionary 14 are stored 22.

An individual speaks 23 a predetermined set of words containing predefined sounds. The sounds contained in the spoken words are processed 24 to define the translation into a sound alphabet translator 16 that is specific to the individual. The individual speaks 25 phrases that are to be processed to produce the transcription. The sounds contained in the spoken phrases are processed 26 such that sounds from the sound alphabet translator 16 are output when they are spoken by the individual, and the sounds output from the sound alphabet translator 16 are compared to the sounds in the sound dictionary 14. When matching sound sequences are found, the stored text sequences 17 are accessed 27. The accessed text sequences 17 are printed 28 to form a transcription.

The present invention provides for continuous speech recognition using a limited number of sounds, and makes the speech easier to recognize. Training the system 10 and method 20 requires only speaking a set of words with the desired sounds imbedded therein. The training process takes about thirty seconds. The system 10 and method 20 are therefore speaker dependent, in that the present approach recognizes anyone's speech imperfectly, and only the individual that is currently using the system and who has generated a training set of sounds will have his or her sounds recognized well.

The method 20 and apparatus 10 provides for continuous speech recognition, that may optimally used to generate radiology reports, for example. The method 20 and apparatus 10 are speaker dependent, and recognizes the sounds from the individual that is currently operating the system 10 and method 20 using a set of sounds recorded during training.

The present invention recognizes phrases, not words. The phrases are connected speech. The only departures from continuous sounds are those that occur naturally, such as glottal stops and pauses between words. The lack of speech is treated as a sound in the sound sequence. Natural phrasing is formed by sentences. When a period is found in the text, a new search for a phrase that matches the continuation of the speech is initiated.

The apparatus 10 and method 20 can generate long strings of text with only a few words. That is, the sound sequence for a text string is used as a "code word" for the text string. A simple example is the phrase "Normal Chest". Many radiologists use a long string of text that describes a normal chest in reports. Many other text strings may be triggered by a phrase.

The apparatus 10 and method 20 provide for speaker dependent, continuous speech recognition using a very limited vocabulary. The vocabulary used in radiology is very limited, and only a few hundred words are typically used to dictate reports. If a single radiologist is considered, the vocabulary may be much smaller, such as if only chest exams, for example, are reported on by that radiologist.

The sounds that an individual makes while speaking are related to sounds that others make, but vary depending on regional accents and particular habits of speaking. The English language has a large range of sounds that are used in different segments of speech. At the same time, there are only a limited number of sounds that represent the basic information in the words. There are many sounds that are transition sounds as the voice changes from one basic sound to another. In the recognition of simple individual words, the recognition of the transition sounds is important. However, in the recognition of complex words or phrases, the transition sounds are less important.

The sound vocabulary or sound alphabet used in the present apparatus 10 and method 20 is shown in Table 1.

TABLE 1

| Sound | Word | Sound | Word | Sound | Word |
|---|---|---|---|---|---|
| u | cut | a | cot | aa | cat |
| e | let | i | lit | ay | say |
| ee | see | o | go | uu | gruesome |
| r | ray | l | lay | m | may |
| n | nay | ng | ping | v | very |
| z | zing | s | say | f | far |
| j | just | h | heavy | sh | should |
| p | ping | b | bad | g | good |
| d | dog | k | cat | t | tarry |
| h | heavy | th | thing | | |

It is known that 80 or more different sounds can be recognized if all transition sounds are included instead of the simple set described above. However, the approach used in the present invention makes the simple sound set adequate for recognition.

A very difficult part of speech recognition is the recognition of short words. "The", "and", and "are"can be easily confused with many different words or parts of words. Since they are so short, these words have many ways to be confused with other words or parts of words. The recognition of complex words or phrases is easier. A word such as "pneumothorax" has four syllables with nine basic sounds. It is much easier to recognize multi-syllabic words than short words. When a short word is part of a phrase, it is much easier to recognize.

The present speech recognition apparatus 10 and method 20 operates to recognize phrases instead of words, and speech recognition is much easier. A phrase has a number of syllables including a large number of sounds. The individual sounds and their ordering are much more characteristic of the phrase than are the sounds of a short word. When the speech recognition is restricted to a particular subject by a particular individual, the phrase recognition is much easier. One individual will tend to speak the same thought in much the same way. The result is that there is no need to recognize individual words.

A conventional method of recognizing phrases is to use a "hidden Markov model". This approach recognizes that a set of sounds is normally followed by a second set of sounds. There is some possibility that other sound sequences will follow, but it is more likely that a particular sound set will follow. The hidden Markov model establishes the probability of transitions from one sound string to the next sound in the sequence. A first order model calculates the probability of the next sound based on the last sound. A second order model is more complex, calculating the probability of the next sound based on the last two sounds. With each change in the sound sequence, comes a change in the phrase that is spoken. By extension, Markov models with many sounds may be used in higher order systems. The higher the order of the Markov model, the more likely it is that the model will accurately predict the next sound, making changes from that predicted sound easier to detect.

A simpler approach is used in the present invention that does not use hidden Markov models. A hidden Markov model is developed by analyzing a large quantity of speech to determine the transition probabilities. However, if the individual is likely to repeat a phrase that has been spoken in the past, the speech recognition need only recognize that the phrase is being repeated. Only at breaks such as ends of sentences and paragraphs will the individual embark on a new thought.

Radiology fits this model of speaking very well and the use of hidden Markov models are not required to perform speech processing using the present invention. A collection of old reports contain the phrases that are likely to be used in the new report. The old report is used to predict what is going to be said in the new report up to a break point, such as the end of a sentence. In many cases the dictation can actually be faster than the individual, indicating what the individual is likely to say from the things that have been said in the past in similar circumstances.

A sequence of words in a phrase result in a sequence of sounds when they are spoken. Text from old reports is converted into sequences of sounds using the sound translations (sound alphabet) of Table 1. The conversion process uses the sound dictionary 14 for each of the words that are in a phrase.

There are some complications in building the sound dictionary 14. The spelling of words in sounds is not always straight forward. In a Webster's dictionary there is a pronunciation guide for each word. The translation of the pronunciation guide into the sounds in Table 1 is a simple process. However, people do not always speak in accordance with the pronunciation guide. A simple example is the word "chest". People enunciate the "ch", the "e", and the "s", but the "t" sound may be lost. In the context of radiology the word "chest" is easily recognized without the final "t" sound.

The English text is converted to sequences of sounds for each of the old reports comprising the recorded text sequences 17. The reports are then regarded as one long sequence of sounds. The problem is converted from one of recognizing individual words to one of recognizing the location in this long list of sounds that corresponds to the phrase the individual is currently speaking that has been spoken before.

English text is generated by recognizing the location in the sequence of historical sounds that corresponds to what is being spoken by the individual. The English text that produced the historical sounds is generated for that phrase. A simple indexing scheme from the sound sequence to the original text is all that is necessary to generate the English text. A particular phrase may be in several places in the long sequence of sounds. However, as long as the phrase is recognized, the same text will be generated regardless of where it occurs in the historical sound sequences.

There are several well established schemes for recognizing individual sounds. One such scheme is the use of "Cepstral" coefficients. In the present invention, Cepstral processing is used to generate the sound alphabet. A sound, x(t), is broken into segments. Each segment is transformed using a Fourier transform to form energy in frequency cells. The Fourier transform is easily computed using a fast Fourier transform, many different versions of which are available. Fast Fourier transforms are discussed by Flannery, et al. in *Numerical Recipes*, Cambridge University Press, New York, 1986.

The Cepstral coefficients are generated by forming measures of the energy in frequency cells. The cells start with narrow bandwidths at low frequencies and have larger bandwidths at the higher frequencies. The Cepstral cells start with the same bandwidth as the Fourier transform cells at low frequencies. At higher frequencies the cells have larger bandwidths, adding together the energy from several Fourier transform cells using the equation:

$$C(k) = \sum_{f=0}^{n} wk(f) * \log(|Fx(f)|^2)$$

where C(k) is related to the Cepstral coefficient by a Fourier transform, n is the number of frequency cells in the Fourier transform, wk(f) is a weighting of the Fourier coefficients that depends on the particular coefficient, and Fx(f) is the Fourier transform of the segment of the sound signal x(t).

Figure 3:
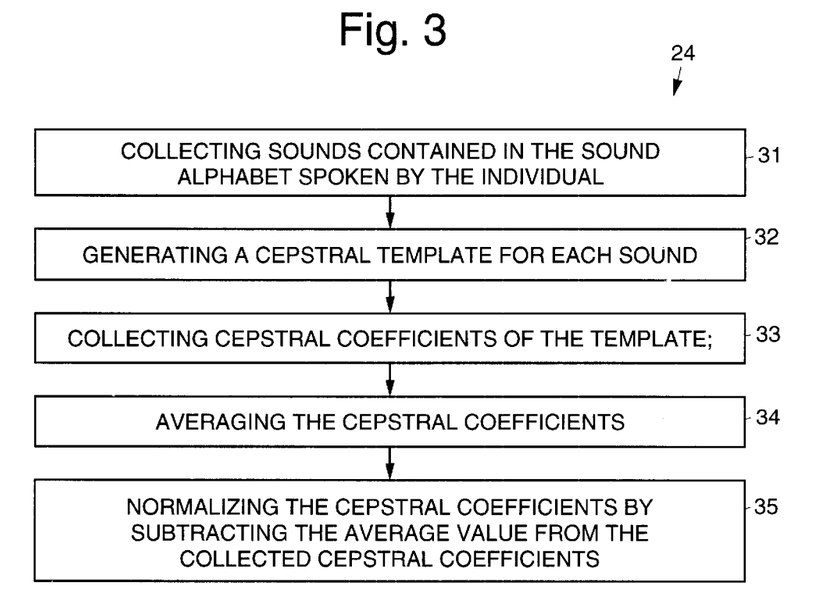
FIG. 3 is a flow diagram illustrating steps used to create a sound alphabet. employed in the present invention.

With reference to FIG. 3, training for the system is a process of collecting 31 the sounds of Table 1 and generating 32 a Cepstral template for each sound. A ten second segment of each sound is collected. The Cepstral coefficients for the ten seconds are collected 33 and averaged 34. The result is normalized 35 by subtracting the average value. Since there is a logarithm in the process, subtracting the average value is the same as normalizing the amplitude of the underlying signal.

By comparing a sound with the stored average value of the sound for the particular individual, the sound is identified. The identification process is a simple nearest neighbor pattern recognition process. The normalized Cepstral coefficients for the new sound are found. The sum of squares of the differences between the stored sound coefficients and the coefficients of the new sound are formed. The sound with the smallest sum of squares is the probable new sound. The identification of the sound is then reported out.

The process works well for voiced sounds and fricatives, but not for plosives. The plosives use the same basic procedure, but with the template collected over several sets of the sound, since the sounds are short. Additional measures of the signal are the center frequency, bandwidth, and the skew of the frequency content. These measures are formed by a central moment, second moment, and third moment of the energy over frequency from the Fourier transform.

The details of the sound processing performed in the present invention are as follows. The basic sound signal is sampled at a convenient sample rate. For the equipment that was used to perform this processing, a sample rate of 11 KHz was enough to capture voice energy out to 5.5 KHz. A Fourier transform is formed over blocks that were 128 samples long, or 11.6 milliseconds. The next block is formed starting 64 samples further along in the data stream with an overlap of one-half block with the last sample.

Cepstral processing follows the Fourier transform processing. Once the Cepstral coefficients are available, the nearest neighbor among the sounds in the sound alphabet is found. The sound alphabet contains a list of sounds, one for each 5.8 milliseconds. For context, the syllabic rate for an average English person is about 10 syllables per second. One syllable is about 20 times longer than the interval that is sampled. The plosives are considerably shorter, 10 to 20 milliseconds. The plosives are two to four times longer than the sampling interval.

The measures of the signal that are made are statistically stable. That is, several measurements of the same sound are similar. The energy of a single Fourier transform cell varies widely from one Fourier transform to the next when the sound is noise. The techniques used in the present invention are much more statistically stable, because they use energy over a number of cells. The length of the Fourier transform, 128 samples, has been selected with this statistical stability in mind.

There may be duplicates in the sound alphabet, since many sounds are 10 to 20 times longer than the sample interval. The repetitions of the sound do carry some information. A very short sound is likely to be an error. There should be many samples of the sound in one syllable for voiced sounds. The processing of the spoken sounds proceeds by deleting samples that are only one sample long, and terminating those that are more than three samples long at three samples. Fricatives ("s", "f", etc.) are processed the same way as the voices sounds. The fricatives are also longer sounds that should have many samples in a syllable. Plosives are shorter sounds. The "t", "k", "b", and "p" sounds are transitional sounds, starting from a stop and using an explosion of air to make the sound. The sound is much shorter, so there are only one two four samples in the list. All of the plosives are retained up to three samples, and the rest are deleted.

The result of the processing is an edited list of sounds that is compared with the sounds from the translated text contained in the sound library 16. There is no attempt to stretch sounds or otherwise match lengths of sounds as has been done in the past. The only thing that has been done is to indicate the reliability of the recognition of the sound with the number of repetitions, two for moderately reliable, and three for reliable detection.

In the present invention, the speech recognition involves matching sound symbols from text to the sound symbols from a spoken phrase or sequence. The problem is similar to a coding problem, wherein a sequence of coding symbols is examined. Redundancy in the code enables the detection of errors and the correction of the errors. In general, the problem is one of simple errors. There is not generally a problem with lost coding symbols or extra coding symbols. The voice processing problem is different in the possibility of dropping sounds or adding sounds.

In coding, a synchronizing scheme is used to determine the start of a sequence. A short sequence of coding symbols is buried in the symbols. This known sequence can be compared with the synch sequence by shifting the synch sequence one symbol at a time and doing a comparison of the symbols in the synch sequence with the received sequence. Over the length of the synch sequence the number of matches can be counted, a well established measure of the distance between two code sequences known as the Hammiing distance. When the number of matches is high, the synch sequence has been found. Further processing to determine following symbols. removing errors can be performed knowing where the "beginning" is located.

In voice processing, the beginning of a phrase corresponds to the synch sequence. A short segment of sounds at the beginning of a phrase is compared to the sound equivalent of a string of text. Where the number of matches is high, it is likely that the sounds can be decoded into the matching text correctly. The sound segment is not a word, but may be several words. A typical parameter value for the segment is 10 syllables. There may be a number of places where the same set of syllables occur in the text. A number of possibilities are tracked at one time to account for the multiple occurrences. The more places that have the same text, the more likely it is that this text is the same text, so multiple occurrences of a single phrase in the text is positive.

Once synchronization occurs, the text can be followed by continuing to match the phrase with a moving window of sounds from the individual. Once again the match is with a number of syllables, not a single word. Following one of the possible text sequences, the sound sequences match until the text departs from what the individual is saying. At that point, the text sequence is discarded.

The matching of sounds is more complex than the matching of codes. The individual's sound sequence can have extra sounds or sounds can be missing. The matching of the sounds takes into account the variability in length as well as possible errors in the sounds themselves. The extra sounds and the missing sounds are accounted for by checking to find whether one of the sequences is imbedded in the other. That is, if the individual's sound sequence has a missing sound, this sound sequence will be found in the text generated sound sequence along with a few additional sounds. The process of checking for imbedded sequences is straightforward. Starting at the beginning of the two sound sequences to be checked for matching, the first sound between the two sequences is compared. If there is a match, the process steps to the second sound in each sequence. If there is no match, first one, then the other sequence is stepped by one sound and checked for a match. At the end of the checking process, both sound sequences will have been tested for imbedding in the other sequence.

A simple place to terminate a match of sound sequences is a period in the text. At the next set of sounds, the process of searching through all of the text generated sounds for a matching sequence is begun again. The period is the signal that all of the unresolved differences in the pieces of text being tracked should be resolved and the text presented to the user.

It is also possible that the individual's sound sequence does not follow any one text track from beginning to end of a sentence. In the middle of the sentence, the match measure will begin to fall off strongly. When there are no continuing matching text sequences, the process begins as is done at the beginning of a sentence with a search through the entire text for matching sequences. The result is that the text that is matched contains whole sentences or large segments of phrases. Continuous speech is required for the process, since breaks between words are a phenomena of the text, not of the speech.

Thus, a method 20 and apparatus 10 that provide for automatic speech transcription for use in transcribing structured reports has been disclosed. The present invention provides for speaker dependent, continuous speech recognition using a limited vocabulary. Transcription is based on recognition of a vocabulary of sounds followed by a translation to text. The translation to text matches the spoken sounds to sounds contained in similar text sequences. Training requires speaking a set of words having desired sounds imbedded therein. The present invention recognizes phrases, not words, and works well in a radiology or similar application because of the use of a very limited vocabulary.

It is to be understood that the described embodiments are merely illustrative of some of the many specific embodiments which represent applications of the principles of the present invention. Clearly, numerous and other arrangements can be readily devised by those skilled in the art without departing from the scope of the invention. In particular, variations of the teachings described herein may be used to perform the present invention. In particular, other methods of translating spoken sounds to a sound alphabet may be used,. Other means for processing the sounds that result in the identification of the sound may e used. Other techniques for segmenting the sounds to eliminate the dependency on the length of the sound may be used.

What is claimed is:

1. A continuous speech voice transcription method comprising the steps of:

recording historical text spoken by an individual relating to a subject;

generating a sound dictionary that comprises sounds contained in the recorded historical text;

creating a sound alphabet by causing an individual to speak predetermined words containing a predefined set of sounds;

speaking text relating to the subject that is to be transcribed;

comparing sequences of sounds found in the sound alphabet that correspond to sequences of sounds found in the spoken text to sequences of sounds contained in the sound dictionary;

when a match between the compared sequences of sounds occurs, locating text that is associated with the sequence of sounds contained in the sound dictionary; and outputting the associated text from the recorded historical text as a transcription.

2. The method of claim 1 wherein the step of creating the sound alphabet comprises the steps of:

collecting sounds contained in the sound alphabet spoken by the individual;

generating a Cepstral template for each sound;

collecting Cepstral coefficients of the template;

averaging the Cepstral coefficients; and normalizing the Cepstral coefficients by subtracting the average value from the collected Cepstral coefficients.

3. Continuous speech voice transcription apparatus comprising:

a microphone;

a sound processor comprising:
    a memory for storing historical text spoken by an individual relating to a subject;
    a sound dictionary that comprises sounds contained in the recorded historical text;
    a sound alphabet translator formed by causing an individual to speak predetermined words containing a predefined set of sounds; and
    a comparator for comparing sequences of sounds found in the sound alphabet that correspond to sequences of sounds found in the spoken text to sequences of sounds contained in the sound dictionary, and for locating text that is associated with the sequence of sounds contained in the sound dictionary when a match between the compared sequences of sounds occurs; and apparatus for outputting the associated text from the recorded historical text as a transcription.

4. A method of translating sounds a spoken into a microphone by an individual into sound alphabet comprising the steps of:

converting sound spoken the microphone into electrical signals;

processing electrical signals corresponding to short segments of sound using a fast Fourier transform to generate energy as a function of frequency for each of the short segments of sound;

processing the energy produced by the fast Fourier transform to generate Cepstral coefficients representative of each of the short segments of sound; and finding sounds in a training set of sounds spoken by the individual that have a set of Cepstral coefficients most like those of the Cepstral coefficients contained in the spoken sounds to produce the sound alphabet.

5. A method of creating a sound alphabet comprising the steps of:

Fourier transform processing sounds spoken by an individual to produce energy as a function of frequency for the sounds;

processing the energy produced by Fourier transform processing to generate Cepstral coefficients representative of the sounds;

comparing Cepstral coefficients of sounds from a training set sounds spoken by the individual to Cepstral coefficients contained in each of the spoken sounds to produce the sound alphabet;

deleting short sounds from the sound alphabet except for plosives; and deleting repetitions of the sounds in the sound alphabet after a predetermined number of repetitions.

6. The method of claim 1 wherein the step of comparing sequences of sounds comprises the steps of:

comparing a first sound contained in a spoken sound sequence with a first sound contained in a text generated sound sequence;

when the comparison generates a match, stepping to the next sound in each sequence and comparing the next sounds of each sequence;

when the comparison does not generate a match, comparing the nonmatching sound of one sequence with the next sound of the other sequence and comparing the nonmatching sound of the other sequence with the next sound of the one sequence until a match is found;

when a match is found, stepping to the next sound in each sequence; and repeating the last three steps until the end of either sequence is reached to determine if sounds of one sequence are imbedded in the other sound sequence.

* * * * *